US012796710B2

(12) United States Patent
Hawley

(10) Patent No.: US 12,796,710 B2
(45) **Date of Patent: *Nov. 17, 2026**

(54) EDIBLE PET CHEW WITH THERMO-PROCESSED SHELL AND COLD-FORMED FILLING

(71) Applicant: Blake Hawley, Lawrence, KS (US)

(72) Inventor: Blake Hawley, Lawrence, KS (US)

( * ) Notice: Subject to any disclaimer, the term of this patent is extended or adjusted under 35 U.S.C. 154(b) by 148 days.

This patent is subject to a terminal disclaimer.

(21) Appl. No.: 18/818,164

(22) Filed: Aug. 28, 2024

(65) Prior Publication Data

US 2024/0415151 A1 Dec. 19, 2024

Related U.S. Application Data

(63) Continuation of application No. 18/133,381, filed on Apr. 11, 2023, now Pat. No. 12,075,799, which is a continuation of application No. 16/930,604, filed on Jul. 16, 2020, now Pat. No. 11,766,051.

(60) Provisional application No. 62/875,024, filed on Jul. 17, 2019.

(51) Int. Cl.

| | |
|---|---|
| ***A23K 10/30*** | (2016.01) |
| ***A23K 20/163*** | (2016.01) |
| ***A23K 40/25*** | (2016.01) |
| ***A23K 50/42*** | (2016.01) |

(52) U.S. Cl.

CPC ............ *A23K 10/30* (2016.05); *A23K 20/163* (2016.05); *A23K 40/25* (2016.05); *A23K 50/42* (2016.05)

(58) Field of Classification Search

CPC ...... A23K 10/30; A23K 20/163; A23K 40/25; A23K 50/42

See application file for complete search history.

(56) References Cited

U.S. PATENT DOCUMENTS

| | | | |
|---|---|---|---|
| 4,847,098 | A | 7/1989 | Langler |
| 5,296,209 | A | 3/1994 | Simone et al. |
| 5,407,661 | A | 4/1995 | Simone et al. |
| 5,792,470 | A | 8/1998 | Baumgardner |
| 5,853,757 | A | 12/1998 | Durand et al. |
| 6,254,910 | B1 | 7/2001 | Paluch |
| 6,277,420 | B1 | 8/2001 | Andersen et al. |
| 6,455,083 | B1 | 9/2002 | Wang |
| 8,367,144 | B2 | 2/2013 | Pater et al. |

(Continued)

FOREIGN PATENT DOCUMENTS

WO 2013048659 A1 4/2013

OTHER PUBLICATIONS

Natural Products Insider. (Aug. 2, 2007). "Savings via dairy substitutes," [online] [retrieved on Feb. 15, 2023], retrieved from <URL: https://www-naturalproductsinsider-com.webpkgcache.com/doc/-/s/www.naturalproductsinsider.com/specialty-nutrients/savings-dairy-substitutes>.

(Continued)

*Primary Examiner* — Katherine D Leblanc

(74) *Attorney, Agent, or Firm* — Dentons US LLP; Derek Auito

(57) ABSTRACT

The present invention relates to an edible pet chew where the pet chew comprises a thermo-processed shell and a cold-formed filling; the cold-formed filling is prepared at approximately room temperature and is not cooked; the thermo-processed shell contains cellulosic fibers, a humectant and a gelling agent; the cold-formed filling can contain thermally labile nutrients and/or actives; and the pet chew is made by co-extruding the filling into the extruded tube-shaped thermo-processed shell.

19 Claims, 1 Drawing Sheet

(56) References Cited

U.S. PATENT DOCUMENTS

| | | | |
|---|---|---|---|
| 2006/0193959 | A1 | 8/2006 | Nie et al. |
| 2014/0295052 | A1 | 10/2014 | Elliot et al. |

OTHER PUBLICATIONS

MALTRIN® M100 Maltodextrin. Datasheet. Grain Processing Corporation (Muscatine, Iowa), M100 TI 011314, (2 pages) (2014).

EDIBLE PET CHEW WITH THERMO-PROCESSED SHELL AND COLD-FORMED FILLING

CROSS-REFERENCE TO RELATED APPLICATIONS

This application is a continuation application of U.S. patent application Ser. No. 18/133,381, filed Apr. 11, 2023, which is a continuation application of U.S. patent application Ser. No. 16/930,604, filed Jul. 16, 2020 (now issued as U.S. Pat. No. 11,766,051), which claims priority to and the benefit of provisional patent application 62/875,024, filed Jul. 17, 2019, which is hereby incorporated by reference.

STATEMENT REGARDING FEDERALLY SPONSORED RESEARCH

Not Applicable.

APPENDIX

Not Applicable.

BACKGROUND OF THE INVENTION

Field of the Invention

The present invention relates to edible pet chew having a thermo-processed shell and a cold-formed filling. The edible pet chew provides oral care properties and contains thermal labile nutrients and/or actives that are cold-formed to preserve their nutrient and active values. In a preferred embodiment, the thermo-processed shell and the cold-formed filling are co-extruded and face cut to form edible pet chews.

Related Art

U.S. Pat. No. 6,254,910 discloses a delivery system for process unstable or sensitive ingredients that consists of a dual texture food product having a first and second component. The first component contains a mixture of lipid and solid ingredients forming a cream-textured matrix that is formed without an aqueous phase and a total moisture content less than about 15 wt. %. The first component includes a process-unstable or sensitive ingredient. The second component contains at least one ingredient comprising a carbohydrate, fat, protein or combination thereof. The second component has a total moisture content less than about 20 wt. %. The second component completely surrounds the cream-textured matrix of the first component thereby maintaining the viability of the process-unstable or sensitive ingredient.

U.S. Pat. No. 5,407,661 patent discloses an edible pet chew having oral care properties. The chew contains cellulosic fibers, water and a humectant to provide flexibility. There is no mention of using the pet chew to deliver heat labile nutrients and actives.

U.S. Pat. No. 5,853,757 discloses an edible pocket in which to insert pills, capsules or other medicines. The pocket is made of soy flour, water, meat products and glycerine.

U.S. Pat. No. 5,407,661 discloses a thermoplastic pet chew with nutrients and cellulosic fibers.

SUMMARY OF THE INVENTION

The present invention relates to edible pet chews. The pet chew is free of dairy, meat products, eggs, and is high fiber and low fat. The carbohydrates are easily digestible. It comprises a thermo-processed shell and a cold-formed filling. The thermo-processed shell is formed by heating above at least about 50° C. The cold-formed filling is prepared at or under about 25° C. and is not cooked. In a preferred embodiment, the thermo-processed shell contains cellulosic fibers, a humectant and a gelling agent, and provides dental care properties. In a preferred embodiment, the cold-formed filling contains thermally labile nutrients and/or actives. Thermally labile nutrients and/or actives break down when exposed to heat. In a preferred embodiment, the thermo-processed shell is reacted and extruded as a tube. In the preferred embodiment, the edible pet chew is produced by co-extruding the cold-formed filling via a positive displacement pump into the thermo-processed tube. The positive displacement pump doesn't create heat which would destroy the thermally labile nutrients and/or actives. The filling is designed to have low enough water activity (Aw) to minimize microbial growth, but sufficient moisture to extrude the filling into the tube simultaneously using a positive displacement pump. The preferred range of Aw is from about 0.4 to about 0.9. In a more preferred embodiment, the Aw of both the shell and the filling are approximately the same value.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
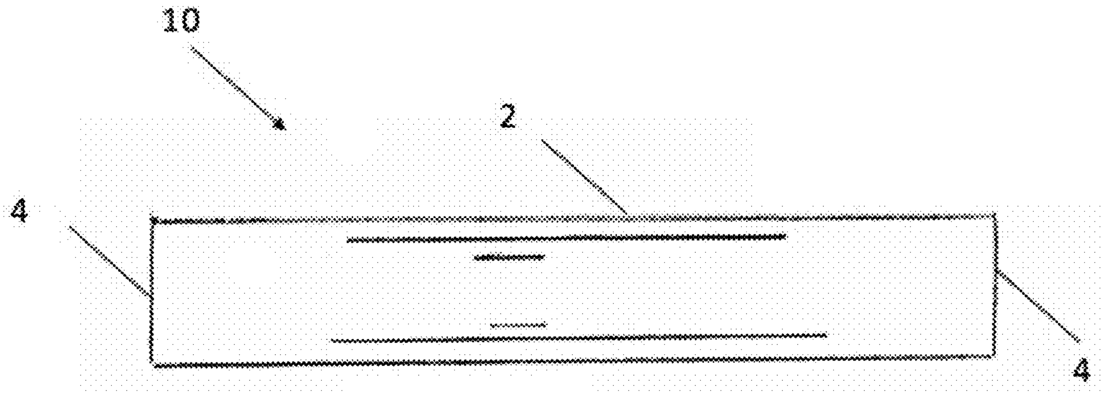
FIG. 1 is a side view of the edible pet chew of the present invention.

The following description of the preferred embodiment(s) is merely exemplary in nature and is in no way intended to limit the invention, its application, or uses.

The edible pet chew of the present invention comprises a thermo-processed shell and a cold-formed filling. In a preferred embodiment, the thermo-processed shell of the present invention comprises cellulosic fiber, a humectant and a gelling agent. The cellulosic fibers are present in the thermo-processed shell in the range of from about 5 to 25 wt. %. In a preferred range, they are in the thermo-processed shell from about 10 to 25 wt. %. In a more preferred embodiment, the lignocellulosic fibers are *Zea mays*. Preferably the *Zea mays* fibers are from about 25 to about 225 microns to allow fine mixing and moisture absorption. This contributes to the pliability which provides salivatory stimulation when consumed by the pet.

The humectant is present in the thermo-processed shell in the range of about 20 to 55 wt. %. In a preferred range, it is present in the range of about 20 to 30 wt. %. Suitable humectants for the thermo-processed shell include, but are not limited to glycerin, lactic acid, polyols, propylene glycol, corn syrup, high fructose corn syrup (HFCS), including Cornsweet 55 and Cornsweet 42, and sorbitol. A preferred humectant is glycerine, more specifically, vegetable and coconut glycerine.

The gelling agent for the thermo-processed shell can be one or more than one well-known food grade gelling agents. The gelling agent is present in the thermo-processed shell in the range of from about 15 to 50 wt. %. A preferred range is from about 15 to 30 wt. %. Suitable gelling agents include hyaluronic acid, a salt of hyaluronic acid, carboxymethyl cellulose, guar gum, and a combination of guar gum and xanthan gum. Preferred gelling agents include tapioca starch, corn starch and Gelatin 150 Bloom, a purified and sterilized collagen extracted from beef-bone.

Preferably, the thermo-processed shell is made by forming a pre-mix of dry ingredients. These include Tapioca Starch at about 20 to 80% volume by weight, non-GMO *Zea mays* cellulosic fibrous material at about 20 to 60 wt. %. A preferred range is from about 38 to 42 wt. %. The 150 Bloom Gelatin is present at about 1 to 20 wt. %. A preferred range is from about 8 to 12 wt. %. Optionally, a natural preservative and dry palatant can also be added. In a preferred embodiment, the premix is from about 30 to 50 wt. % of the total thermo-processed shell formulation.

The *Zea mays* cellulosic fiber provides dental care properties that include mechanical cleansing to remove dental plaque, stain, and tartar on the tooth surface. The gelatin materials and humectant provide a flexible, pliable pet chew that stimulates a hyper-salivatory function. Stimulated saliva is produced in response to mechanical, gustatory, and olfactory stimuli. Protection of the oral and perioral tissues occurs because of lubrication and dilution of sugars after food and drink intake. This provides antimicrobial and cleansing activity; degradation of bacterial cell walls to inhibit growth; buffering (neutralizing) acid production and controlling plaque pH with bicarbonate; remineralization of enamel with calcium and phosphates; and tissue repair. It also provides breath freshening properties.

Tapioca starch functions in the thermo-processed shell as a matrix. When processed in an extruder, the mechanical work of the extruder expands the matrix during the cook process, and gels the *Zea mays*, starch and gelatin forming the thermo-processed shell. The shell is processed at a temperature greater than about 50° C. Preferably, the processing temperature is greater than about 80° C. As the starch granules swell, they release amylopectins and amylose. This serves to thicken and form a gelatinized matrix within the cellulosic fibrous structure. The structure has the effect of providing a chewy product versus a typical extruded dog kibble which is hard and fractious. Preferably, the tapioca starch is generally provided in the outer crust formula at between 10-70 wt. %. A more preferred range is from about 15 to 30 wt. %.

The final component of the thermo-processed shell is 150 Bloom gelatin, which is preferred in the present invention and serves as a proteinaceous binder. Preferably, it is derived from dry granules with about 99% passing through a #40 mesh U.S. standard sieve, and is purified and sterilized collagen extracted from beef-bone. Preferably, it is used at between about 2 and 10 wt. %. A more preferred range is about 3 to 8 wt. %. The 150 Bloom gelatin adds to the pliable nature of the thermo-processed shell component when a water activity (Aw) of about 0.77. The Aw of the thermo-processed shell is matched to the Aw of the filling material so there is no leakage from inside to out or outside to in, thus preserving both the chew texture of the thermo-processed shell and the soft texture cold-formed filling.

Additional ingredients can be added to the thermo-processed shell including non-GMO chicken liver palatant and preservatives which combined are less than about 5% by dry weight of the outer shell mixture.

The cold-formed filling is a no-cook filling that is formed at about 25° C. or less. It is also formed or extruded in a way to not heat the filling. Preferably, the cold-formed filling comprises about 10 to 15 wt. % glycerin. In a more preferred embodiment, it contains from about 24 to 27 wt. % glycerin. The filling also comprises from about 5 to 15 wt. % Maltrin®, a mixture of solids of maltodextrins and corn syrup made by the controlled hydrolysis of corn starch. Maltrin provides a smooth, creamy mouthfeel mimicking fat. In a more preferred embodiment, it contains from about 7-10% Maltrin®. The filling also comprises from about 2 to 20 wt. % Inscosity®, which is made by Grain Processing Corp. and is a modified food starch that swells in cold water. In a more preferred embodiment, the filling contains from about 6 to 8 wt. % Inscosity® modified food starch. The cold-formed filling contains from about 1 to 20 wt. % water. In a more preferred embodiment, it contains from about 6 to 7 wt. % water. Additionally, the cold-formed filling includes less than about 10 wt. % gluten. In a more preferred embodiment, it contains from about 3 to 4 wt. % wheat gluten, and less than 1% each humectants, canola oil, flavoring, lecithin, mixed tocopherol antioxidants and the nutraceutical or active added a dosage rate such that the volume of the inner matrix at a length of about 3 inches delivers the desired dosage to the animal.

The water content of the cold-formed filling is low enough to deter bacterial growth, yet high enough to maintain the chewy texture of the thermo-processed shell. A preferred range of Aw is from about 0.40 to 0.90. A more preferred range is from about 0.50 to 0.80.

Figure 2:
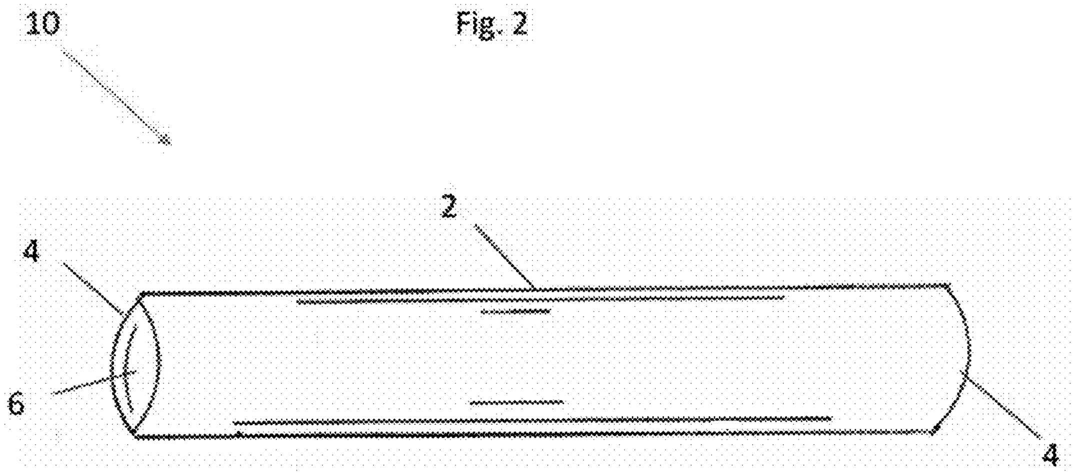
FIG. 2 is a side perspective view of the edible pet chew of the present invention.
Figure 3:
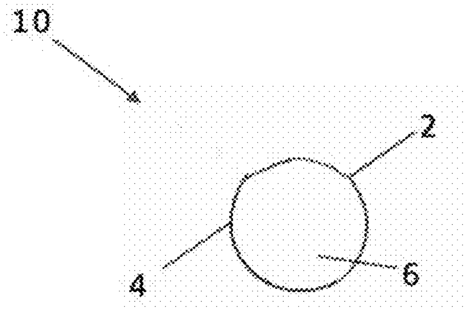
FIG. 3 is an end view of the edible pet chew of the present invention.

In a preferred embodiment, as shown in FIGS. 1-3, the thermo-processed shell 2 of the edible pet chew 10 is filled with the cold-formed filling 6. The thermos-processed shell 2 is cylindrically shaped tube. The tube is filled with the cold-formed filling 6, and the filled tube is face-cut to form the edible pet chew having two face-cut ends 4. The cold-formed filling 6 is of a consistency that is thick enough and has thixotropic properties such that the filling remains in the thermos-processed shell and does not leak or protrude out of the shell. The ends 4 of the edible shell are open and the cold-formed filling is unenclosed at the ends of the thermos-processed shell. The shell is not crimped at the ends to enclose the cold-formed filling inside the shell.

The critical components to the cold-formed filling is that the consistency of the mix's water activity is matched to that of the outer core so there is no transmission between the two and so that the flow consistency on the Vmag results in an inner diameter of between 5-9 mm. The moisture level must be between 10-12% and the water activity in the range of 0.4-0.9 Aw. The thixotropic viscosity of the inner filling is between 170,000-180,000 cP at up to 60 degrees C. and can be measured using a viscometer at discrete processing points or dynamically using a rotational viscometer. These values create a filling that sets well and when face cut using an in-line knife for the 3 inch long edible bites does not create seepage from either of the two cut ends.

Thermally labile nutrients include vitamins C and B (all forms of B). Thermally labile actives include nutraceuticals such as enzymes, peptides, probiotics, or pharmaceuticals such as antibiotics, etc.

Example 1

The preferred thermo-processed shell is prepared by being extruded, the matrix being fracturable, and effective to induce a superior mechanical cleaning action on teeth when chewed. In a preferred embodiment, the shell is extruded as a tube, and the cold-formed filling is placed inside the tube. Other configurations are also considered in the present invention. The shell can be shaped as a cup or as a sandwich, where the filling is between two layers of shells that are swaged together. The following equipment was used to form the thermo-processed shell. The extruder equipment included a Wenger TX57. A Seepex pump was used to discharge water at a rate of 15 kg/h and steam at 5 kg/h into the dry matrix which was fed from a gravity hopper at a temperature of about 33 degrees C. Two co-rotating, flighted material advancing screws comprised the bore of the barrel along the full length of the extruder and terminate at the point of the die.

In preparing the thermo-processed shell, the solid dry components were pre-mixed in a ribbon mixer before being fed into the gravity hopper. As shown in TABLE 1, the pre-mixed ingredients included *Zea mays*, a starch, a gelatin, a palatant and a preservative. This pre-mix was then fed into the extruder pre-conditioner and admixed with a humectant, water and steam at a preconditioned rate of about wt. 26% to initiate a partial cook and the temperature raised to between 6° and 95° C. at a feed rate of 5 pounds per minute. The final formulation is shown in TABLE 2. The preconditioner time was between about 30 sec to 1½ minutes. This process initiates hydration of the matrix. The materials were then advanced to the extruder barrel by the rotating screws in a sequential fashion yielding a solid ribbon of expanded material which expands further as it was blown out of the round die. The extruder shaft speed was maintained at 350 rpm with a motor load of 40-45%. Water flow to the extruder was set in one embodiment between 6-9 kg/h and the internal temperature of the barrel sections rose from 60 to 105° C. sanitizing the product. The extruder discharge moisture was between 28-37%.

This air-dried solid ribbon of thermo-processed shell was fed into a secondary chamber where the cold-formed filling was injected creating a tube filled cold-formed filling. The co-extruded product was face-cut into the edible pet chews. The ends were not crimped, but left open. The filling remained in the thermos-processed shell and did not drip or ooze out beyond the face cut. The formulation of the cold-formed filling and the process of making is shown in TABLE 3 and below.

Artrex™ nutraceuticals by Bioved Pharma (formula in TABLE 4) was added at 0.72 wt. % to the cold-formed filing to deliver about 50 mg active for Small/Toy breeds when a half a chew was fed twice a day, 200 mg of active for medium sized dogs when one chew was fed twice a day and 400 mg active to large breed dogs when two chews were fed twice per day.

TABLE 1

Pre-mix of dry ingredients

| Ingredient | Wt. % |
|---|---|
| Non GMO *Zea mays* cob fractions Screen 80 (92%) and Screen 30 (2.5%), retained on pan (5.5%) lignocellulosic fiber | 40.03 |
| Tapioca Starch-gelling agent | 45.15 |
| Gelatin 150 bloom-gelling agent | 10.5 |
| Dry palatant (AFB 403Q) | 4.00 |
| Potassium sorbate-preservative | 0.31 |
| | 100.00 |

TABLE 2

Final Formulation of Thermo-processed Shell

| Ingredient | Wt. % |
|---|---|
| Pre-mix (42% of formula) | |
| Non GMO *Zea mays* cob fractions-cellulosic fibers | 16.88 |
| Tapioca Starch-gelling agent | 19.04 |
| Gelatin 150 bloom-gelling agent | 4.43 |
| Dry palatant (AFB 403Q) | 1.69 |
| Potassium sorbate-preservative | 0.13 |
| Remaining Ingredients (58% of formula) | |
| Glycerin-USA Coconut-LIQ-humectant | 17.68 |
| Glycerin-Vegetable-LIQ-humectant | 8.96 |
| Maltrin ® 100 | 8.64 |
| Inscosity ®-Modified starch | 7.80 |
| Water | 6.72 |
| Wheat-Gluten Vital | 3.77 |
| Humectants-Sugar-Fine Ground | 0.96 |
| Oil-Canola LIQ | 0.96 |
| Antimicrobials-Cultured Milk | 0.70 |
| Flavors-Charsol C-10 (Smoke)-LIQ | 0.32 |
| Lecithin-Canola-LIQ | 0.32 |
| Antioxidant-Mixed Tocopherols with Rosemary Extract-LIQ | 0.30 |
| Artrex | 0.29 |
| Ginger | 0.29 |
| Turmeric | 0.08 |
| Ginseng | 0.06 |
| Total | 100.00 |

TABLE 3

Cold-formed Filling

| | Filling Ingredient | % |
|---|---|---|
| A | Sugar | 3.01 |
| B | Maltrin ® 100 | 21.81 |
| C | Vital Wheat Gluten | 3.76 |
| D | Inscosity ® B656 | 19.53 |
| E | Water | 23.32 |
| F | Glycerin | 23.33 |
| G | Vegetable oil | 3.01 |
| H | Artrex blend | 2.23 |

TABLE 4

| Artrex blend | grams | Wt. % |
|---|---|---|
| *Withania Somnifera* dry extract | 180 | 40.54 |
| *Boswellia Serrata* dry extract | 180 | 40.54 |
| *Zingiber Officinale* dry extract | 48 | 10.81 |
| Curcumin-95% | 36 | 8.11 |

Process to Make Cold-Formed Filling.

All of the Steps take place at room temperature (about 20 to 22° C.).

Step 1. Mix A, B, C and D together until well blended to make dry blend. Use gentle mixing at first to avoid "dusting".

Step 2. Mix E, F and H together to form a slurry. Add G and mix well.

Step 3. Add slurry of Step 2 to dry blend of Step 1 and mix for 7-10 minutes until dough forms.

It will be the consistency of bread dough.

The embodiments were chosen and described to best explain the principles of the invention and its practical application to persons who are skilled in the art. As various modifications could be made to the exemplary embodiments, as described above with reference to the corresponding illustrations, without departing from the scope of the invention, it is intended that all matter contained in the foregoing description and shown in the accompanying drawings shall be interpreted as illustrative rather than limiting. Thus, the breadth and scope of the present invention should not be limited by any of the above-described exemplary embodiments, but should be defined only in accordance with the following claims appended hereto and their equivalents.

What is claimed is:

1. A method of preparing an edible pet chew, comprising:

preparing a thermo-processed shell comprising from about 5 to 25 wt. % of cellulosic fibers; from about 20 to 55 wt. % of at least one humectant; and from about 15 to 50 wt. % of at least one gelling agent; and filling the thermo-processed shell with a cold-formed filler comprising from about 10 to 15 wt. % glycerin; from about 5 to 15 wt. % of a fat mimicking composition comprising a mixture of solids of maltodextrins and corn syrup; 2 to 20 wt. % modified food starch that swells in cold water; and from about 1 to 20 wt. % water;

wherein the thermo-processed shell has a cylindrical tube shape;

wherein the cold-formed filler is contained within the cylindrical tube shape forming a filled tube;

wherein the filled tube is face-cut on both ends;

wherein the filled tube does not seep cold-formed filler from either end; and wherein the face-cut ends are not crimped closed.

2. The method of claim 1, wherein the cold-formed filler further contains:

(a) a thermally labile nutrient comprising a vitamin selected from among vitamin C and all forms of vitamin B; or (b) a thermally labile active comprising an enzyme; or (c) both (a) and (b).

3. The method of claim 1, wherein the thermo-processed shell provides dental care and breath freshening properties.

4. The method of claim 1, wherein the thermo-processed shell is extruded as the cylindrical tube.

5. The method of claim 4, wherein the edible pet chew is prepared by co-extruding the cold-formed filler via a positive displacement pump into the cylindrical tube.

6. The method of claim 1, wherein the thermo-processed shell and the cold-formed filler have Aw's in the range of from about 0.4 to 0.9.

7. The method of claim 1, wherein the cold-formed filler has an Aw in the range of about 0.50 to 0.80.

8. The method of claim 1, wherein the cellulosic fibers comprise *Zea mays* lignocellulosic fibers.

9. The method of claim 8, wherein the *Zea mays* lignocellulosic fibers have a length from about 25 to about 225 microns.

10. The method of claim 1, wherein the cold-formed filler has a viscosity in the range of about 170,000 to 180,000 cP at a temperature up to 60° C.

11. The method of claim 1, wherein the gelling agent comprises one or more selected from among a hyaluronic acid, a salt of a hyaluronic acid, carboxymethyl cellulose, a guar gum, a combination of guar gum and xanthan gum, a tapioca starch, a corn starch, and a gelatin.

12. The method of claim 1, wherein the gelling agent comprises one or more selected from among a tapioca starch, a corn starch, and a gelatin.

13. The method of claim 12, wherein the gelling agent comprises gelatin and the gelatin is 150 Bloom gelatin.

14. The method of claim 1, wherein the humectant comprises a glycerin, lactic acid, a polyol, a propylene glycol, a corn syrup, a high fructose corn syrup, a sorbitol, or a combination thereof.

15. The method of claim 14, wherein the humectant comprises glycerin and the glycerin is a vegetable glycerin or a coconut glycerin or a combination thereof.

16. The method of claim 1, wherein the thermo-processed shell and/or the cold-formed filler further comprise(s) a palatant, a preservative, or a combination thereof.

17. The method of claim 1, wherein the cold-formed filler further comprises a gluten, a canola oil, a flavoring, a lecithin, a mixed tocopherol antioxidant, or a combination thereof.

18. The method of claim 1, wherein the cold-formed filler has thixotropic properties.

19. The method of claim 1, that wherein the edible pet chew is free of dairy, meat products, and eggs.

* * * * *